United States Patent [19]
Duisters et al.

[11] Patent Number: 4,950,408
[45] Date of Patent: Aug. 21, 1990

[54] PROCESS FOR REMOVING MERCURY FROM A NON-POLAR ORGANIC MEDIUM

[75] Inventors: Henricus A. M. Duisters, Budel; Paul C. Van Geem, Beek, both of Netherlands

[73] Assignee: Stamicarbon B.V., Geleen, Netherlands

[21] Appl. No.: 278,718

[22] Filed: Dec. 2, 1988

[30] Foreign Application Priority Data

Dec. 11, 1987 [EP] European Pat. Off. ............ 87202485

[51] Int. Cl.$^5$ .............................................. B01D 15/04
[52] U.S. Cl. .................................... 210/660; 208/106; 208/251 R; 210/914; 585/823; 585/830
[58] Field of Search ................. 55/72, 74; 208/251 R, 208/106; 210/679, 688, 660, 914; 585/823, 830, 856

[56] References Cited

U.S. PATENT DOCUMENTS

| 3,755,161 | 8/1973 | Yokota et al. | 210/679 |
| 3,785,968 | 1/1974 | Whitehurst | 208/251 R |
| 3,935,098 | 1/1976 | Oda et al. | 210/688 |

OTHER PUBLICATIONS

J. E. Leeper, "Mercury–LNG's Problem," in Hydrocarbon Processing, Nov. 1980, pp. 237–240.

Primary Examiner—Ivars Cintins
Attorney, Agent, or Firm—Cushman, Darby & Cushman

[57] ABSTRACT

The invention is concerned with a process for removing mercury from a non-polar organic medium like a liquid hydrocarbon mixture, most preferably a natural gas condensate, by contacting the medium to be treated with a solid adsorbent, preferably an ion-exchange resin, containing active thiol-groups. By this method it is possible to remove mercury from the treated medium in an amount of more than 97%.

8 Claims, No Drawings

PROCESS FOR REMOVING MERCURY FROM A NON-POLAR ORGANIC MEDIUM

Mercury, even in very small amounts, is toxic and corrosive. When present in media which are in contact with metals, such as aluminium, during their processing and storage, mercury can cause an important corrosion and therefore has to be removed on forehand. Also media discharged to the environment have to be substantially free from mercury because of its toxicity. The presence of mercury in media can also lead to poisoning of catalysts, when used in processing such a medium, for instance in hydrogenation-processing.

G. J. de Jong and C. J. N. Rekers describe in "Proceedings of the First World Mercury Congress", (published in the Journal of Chromatography, Volume 102 (1974), pages 443–451) a process for the removal of mercury from waste water by using an ion-exchange resin containing active thiol-groups, which are —SH-groups, directly bonded to a carbon-atom. In this publication it is emphasized, that this resin reacts only with ionic mercury, i.e. that all metallic mercury in the waste water must be oxidized before it is contacted with the ion-exchange resin.

Mercury very often also occurs in organic media, especially non-polar organic media like hydrocarbon mixtures. A typical example is natural gas which can contain mercury up to 180 $\mu g/Nm^3$ (see e.g. "NAM recovers mercury produced with Dutch natural gas" in The Oil and Gas Journal of April 1972, pages 72–73).

The purification of natural gas includes a partial condensation at which the raw gas is cooled to separate higher boiling components like $C_4$-and higher hydrocarbons or aromates like benzene and its derivates, toluene and its derivates, etc. At this step also the major quantity of the mercury contained in the natural gas is separated and accumulates in the obtained natural gas condensate. Before further processing the gas condensate, such as by steam cracking, the mercury being present in quantities up to 150 $\mu g/kg$ has to be removed in an efficient manner.

It is known to remove elemental mercury from natural gas by contacting the same with sulfur-impregnated activated carbon, metals, like finely divided copper, and metal sulfides, like iron sulfide, or by oxidation of the mercury by strongly oxidizing solutions (J. E. Leeper: "Mercury-LNG's problem", in Hydrocarbon Processing, November 1980, pages 237–240).

By some of these methods it is, however, not attractive to remove mercury from organic media because of the dissolution of sulfur in the organic media and sulfur being unwanted in the further process. Additionally, metals and metal sulfides have the disadvantage of a relatively short life time. For removing mercury present in polar media, like wastewaters, ion-exchange resins are used to remove ionic mercury. No effective solution has been found uptill now to remove mercury from a non-polar organic medium, such as natural gas condensate, in which the mercury will be present in a non-ionic and/or non-dissociated form.

The object of the invention is the provision of an effective process for removing mercury up to the lower ppb-range from a non-polar organic medium, like natural gas, liquefied natural gas, and most preferably natural gas condensate.

According to the present invention mercury is removed from a non-polar organic medium, like a hydrocarbon medium, by contacting the medium with a solid adsorbent containing active SH-groups.

Accordingly, the present invention is based on the surprising discovery, that solid adsorbents containing active SH-groups are capable of adsorbing mercury being present in non-polar organic media. It is surprising that this adsorption occurs, since the prior art—as outlined above—is teaching that solid adsorbents having active thiol-groups are only capable of adsorbing ionic (oxidized) mercury being present in polar aqueous media, like waste water.

Preferably the solid adsorbent is an ion-exchange resin.

As already mentioned the process of the present application is applicable to the removal of mercury from any kind of non-polar organic media, especially media like hydrocarbons, in liquid and also vaporous form. Preferably, however, the process is applied to the removal of mercury from natural gas condensates, i.e. liquid hydrocarbon mixtures, the components of which have higher boiling points than the main constituents of natural gas. Therefore, in the following the process of the present invention is explained by reference to natural gas condensates but it should be emphasized that it is also applicable to other non-polar organic media.

When using the term "active-SH-groups" it is to be understood, that, according to the invention, not only adsorbents having active thiol-groups as such, but also adsorbents having groups which can generate, through tautomerization, active thiol-groups are applicable. Next to that, at least part of the hydrogen in a SH-group may be replaced by a salt-forming component, for instance an alkalimetal As examples of active thiol-groups as such, the following, non-limitative, enumeration can be given:

(1) a mercaptide-group (or thioformyl-group) of the formula:

—C—S—M, (2) a thiazole-group of the formula:

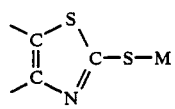

(3) a (di-)thiocarbamic acid-group of the formula:

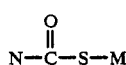

resp.

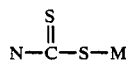

(4) a xanthate-group of the formula:

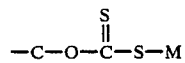

In all above groups, M can represent hydrogen or an alkalimetal.

As groups which can generate, through tautomerization, active thiol-groups the following, non-exhaustive, examples can be given:

(a) a thiocarbazone-or thiocarbadiazone-group of the formula:

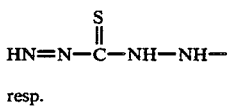

resp.

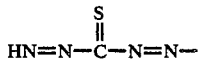

(b) a thio-urea-group of the formula:

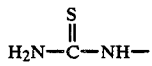

(c) a thiosemicarbazido-group of the formula:

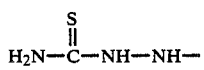

(d) a rubeamate-group of the formula:

In those groups in which more that one hydrogen atom is attached to a nitrogen atom, excessive hydrogen atoms may be replaced by alkyl, cycloalkyl or aromatic radicals, as long as at least one neighbouring hydrogen-radical is still present for the tautomerization.

An ion-exchange resin containing active thiolgroups, useful, according to the present invention preferably is a macroporous copolymer of styrene and divinylbenzene. As an example of such an adsorbent, containing active thiol-groups of the first kind the ion-exchange resin IMAC TMR of Rohm & Haas Company, Philadelphia, U.S.A., can be mentioned, which apart from thiol-groups also contains sulphonic-acid groups. This ion-exchange resin is supplied in form of beads having a particle size of 0,3 to 1,2 mm and a thiol-capacity of 1400 meq/l, and being regenerable by concentrated hydrochloric acid.

An ion-exchange resin containing active thiol-groups of the second kind (i.e. having groups which can generate, through tautomerization, active thiol-groups), preferably useful according to the present invention can be the ion-exchange resin TP 214 of Bayer AG, Leverkusen, W-Germany, which contains thio-urea-groups, also bouded to a polystyrene/divinylbenzene matrix. Also this product is supplied in the form of beads, having a particle size of 0,3–1,3 mm and a capacity of at least 2000 meq/l. This product is regenerable, for instance with $Na_2S$, conform the procedure described in DE-A-2.249.472.

Another example of an ion-exchange resin of the second kind can be the ion-exchange resin Nisso Alm-125 of Nippon Soda Company of Japan, having thiocarbamates as active groups.

Also mixtures of above mentioned solid adsorbents and combinations with already known means for removing mercury can be applied.

To remove effectively mercury from a non-polar organic medium it should be contacted with the solid adsorbents during a residence time of more than 30 seconds.

Depending on the composition of the medium to be treated the temperature at which the medium is contacted with the solid adsorbent can vary between $-30°$ C. and $60°$ C. and preferably between $0°$ and $60°$ C., ambient temperature being the most preferred treating temperature.

Normally, the process of the present invention is carried out under atmospheric pressure, however, in certain cases (if for example the vapour pressure of the medium to be treated is high) it can also be advisable to apply superatmospheric pressure.

Residual mercury measurements have shown that according to the process of the present invention more than 97% of the mercury being present in the starting medium can be removed.

The following examples illustrate the process of the present invention without limiting its scope.

EXAMPLE 1

A natural gas condensate containing mercury in an amount of 35 μg/kg at a temperature of 25° C. and at a pressure of 0,1 MPa is passed in upflow direction through a glass column having a volume of 89 $cm^3$, a height of 32 cm and an internal diameter of 1,6 cm, and being filled with ion exchange resin particles (particle diameters between 0,3 and 1,2 mm) of IMAC TMR of Rohm and Haas Company, Philadelphia, U.S.A. in an amount of 64 $cm^3$. The gas condensate is passed through the column at a rate of 500 g/hour (residence time: 2 minutes).

The amount of mercury is measured by the following method:

A 50–100 g sample is added to a conical flask containing 10 ml 1+1 (v/v) $H_2SO_4$, 3 g $KMnO_4$ and 60 ml water. Then the conical flask is equipped with a reflux condensor, and the flask content is stirred for 30 minutes. Subsequently the mixture is brought to boiling and boils gently during one hour. After cooling the solution to room temperature 1 g hydroxylammoniumchloride is added, the flask is carefully shaken until the black precipitate disappears, the solution is transferred into a separation funnel and washed therein several times with water, which is also added to the separation funnel. After the phases have separated the underlayer (water-phase) is added to a graduated 100 ml-flask, and the separation funnel is washed several times with little water, and this water is also added to the graduated flask. The flask is filled up to the mark with water and the mixture is thoroughly mixed.

The obtained solution is now already for measuring the mercury content by the cold vapour AAS method (ISO-draft ISO/CT-158 SC/2; see also "Analysis of petroleum of trace metals" by Hofstader, Milner & Runnels, American Chemical Society, pages 133 to 148). As determined by the cold vapour AAS method the mercury content of the effluent is less than 1 μg/kg.

Using the same column the flow of gas condensate can be increased up to 2000 g/hour without lowering the above quoted degree of mercury recovery.

EXAMPLE 2

A natural gas condensate containing mercury in an amount of 36–53 μg/kg at a temperature of 25° C. and at a pressure of 0,1 MPa is passed in downflow direction through a glass column having a volume of 188 $cm^3$, a height of 150 cm and an internal diameter of 1,0 cm.

The column is filled with ion exchange resin particles (particle diameter between 0,3 and 1,2 mm) of IMAC GT 73 of Rohm and Haas Company, in an amount of 118 cm$^3$.

The gas condensate is passed through the column at a rate of 2235 g/hour (residence time: 45 seconds).

| Time (days) | Effluent concentration (μg/kg) | Hg removal (%) |
| --- | --- | --- |
| 18 | <1 | >97 |
| 22 | <1 | >97 |
| 32 | 1 | 98 |
| 38 | 1 | 97 |

Even after 38 days the mercury content of the effluent is less than or equal to 1 μg/kg, as determined by the AAS method.

EXAMPLE 3

A natural gas condensate containing mercury in an amount of 27 μg/kg at a temperature of 25° C. and at a pressure of 0,1 MPa is passed in upflow direction through a glass column having the dimensions of example 1. The glass column is filled with 60 cm$^3$ of ion-exchange resin particles of TP 214 of Bayer A.G., Leverkusen, W-Germany. The particle diameters of these particles vary between 0,3 and 1,3 mm.

After flushing the column with acetone, the gas condensate is passed through the column at a rate of 500 g/hour (residence time: 2 minutes). The mercury content of the effluent is less than 1 μg/kg, determined by the AAS method, after 24 hours.

EXAMPLE 4

A natural gas condensate containing mercury in an amount of 27-44 μg/kg at a temperature of 25° C. and at a pressure of 0,1 MPa is passed in upflow direction through a glass column having the dimensions of example 1. The glass column is filled with 56 cm$^3$ of ion-exchange resin particles of TP 214 of Bayer A.G.

The gas condensate is passed through the column at a rate of 420 g/h (residence time: 114 seconds). As determined by the AAS method the mercury content of the effluent is always less than or equal to 1 μg/kg during an experiment of 37 days.

We claim:

1. In a process for cracking a gas condensate the improvement which comprises subjecting said gas condensate to a pretreatment consisting essentially in contacting said gas condensate with a solid adsorbent in the form of an ion exchange resin carrying chemically-bound active -SH groups, to remove mercury therefrom.

2. A process for removing mercury from a non-polar organic medium which consists essentially in contacting said medium with a solid ion exchange resin adsorbent containing chemically-bound active -SH groups, and thereafter separating the ion exchange resin having mercury bound thereto from the now substantially mercury free non-polar organic medium.

3. The process of claim 2 wherein said resin is a macroporous copolymer of styrene and divinylbenzene.

4. The process of claim 2 wherein the active -SH groups are formed as tautomeric groups.

5. The process of claim 2 wherein said non-polar medium is a gas condensate, substantially free from lower boiling gas components, obtained by the partial condensation of natural gas.

6. The process of claim 2 wherein said contacting is carried out for a residence time of at least 30 seconds.

7. The process of claim 2 wherein said contacting is carried out at a temperature from −30° to 60° C.

8. The process of claim 7 wherein said contacting is carried out at a temperature from 0° to 60° C.

* * * * *